INVENTOR:
MARCEL FERRAND

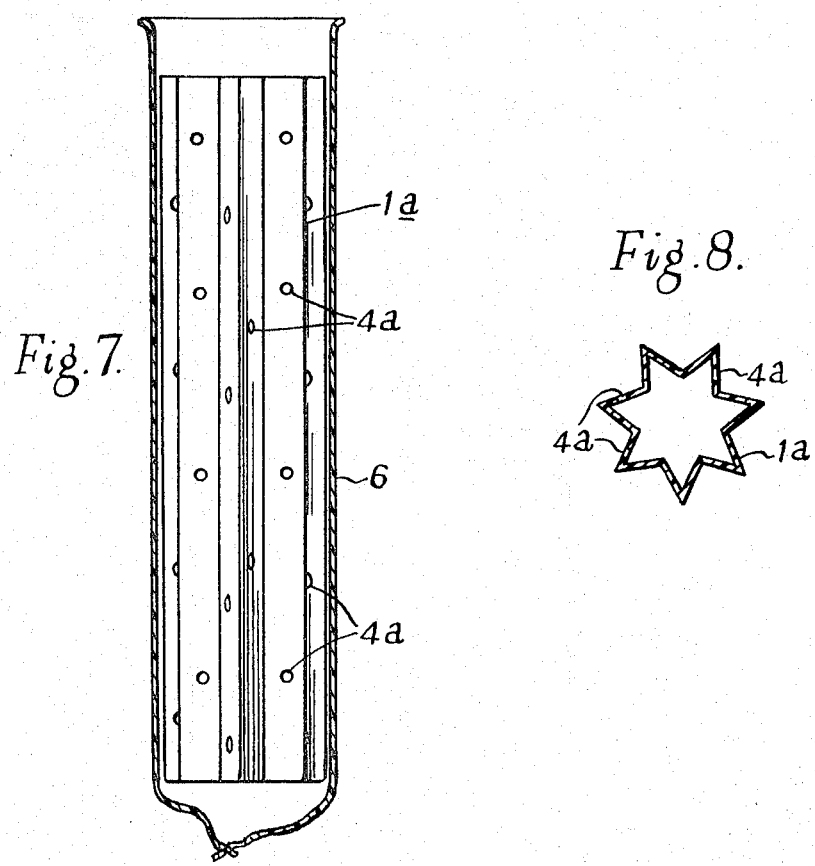

3,302,325
PLANT PROPAGATION DEVICE
Marcel Ferrand, 13 Rue Oswald Larroque,
Toulon, Var, France
Filed June 29, 1964, Ser. No. 378,926
Claims priority, application France, July 2, 1963, 20,212
3 Claims. (Cl. 47—37)

The object of this invention consists of improvements and additions to the device disclosed in my co-pending United States patent application Serial No. 243,261 dated December 10, 1962, now U.S. Patent 3,180,055, issued April 27, 1965, of which this application is a continuation-in-part.

Experience has shown that the use of cylindrical appliances made of plastic material made it possible to plant vegetables in all seasons and hastened their germination as well as their growth.

Nevertheless, it has been observed that even more favourable results could be obtained, in the stage of development of the plant, at the time of its formation, by releasing certain roots and by condensing the humidity at the time of evaportaion of the water.

The characteristic features are the means used, both as a whole and separately, and more particularly: the radially partially collapsed helical shape or star shape cross section together with plural perforation of the cylinder, thus airing and guiding the roots; the envelopment of the cylinder in a secondary external flexible film sheath, of which the base is blocked for the purpose of retaining the compost and forming a humidity reserve by retaining the water; the upper part of the inner cylinder is open and projects sufficiently for the purpose of protecting the young plant; the whole assembly is intended to allow the free development of certain roots in a moist atmosphere between the envelope and the sheath, whilst the main roots obtain, from the mould, the substances which are required for their nutrition.

On the accompanying drawings given by way of non-limiting example of one of the forms of construction of the invention:

Figure 4:
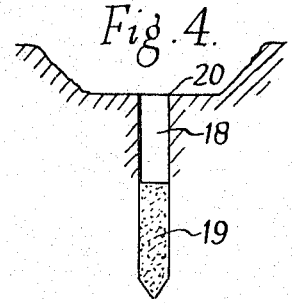
Figure 5:
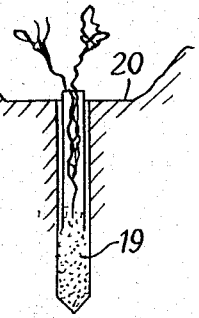
Figure 6:
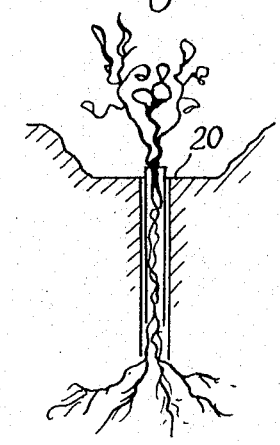

FIGS. 4, 5, and 6 show the use of the tubular appliance.

FIG. 7 is a side elevation showing a modified cylinder of star-shaped cross-section.

FIG. 8 is a section of the modified cylinder of FIG. 7.

Figure 1:
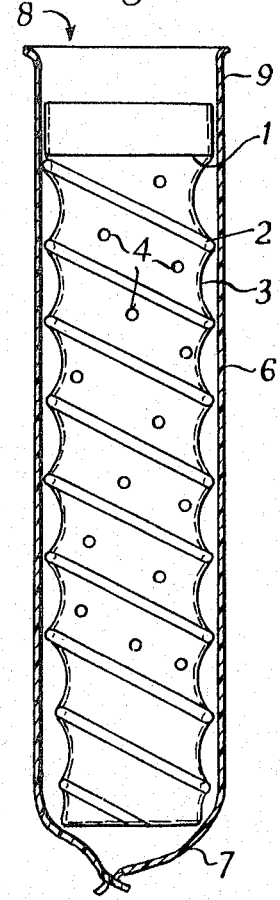
FIG. 1 shows the appliance as a whole, seen in elevation.
Figure 2:
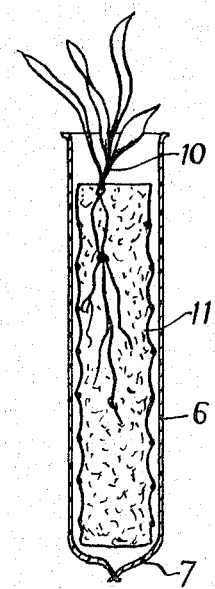
FIGS. 2 and 3 show the development of the plant.
Figure 3:
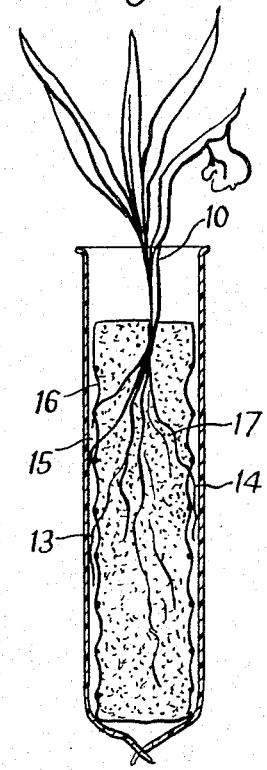

The tubular appliance shown in FIG. 1, made of synthetic plastic material, consists of a cylinder 1 which is helical in shape and forms a honeycomb structure 3 between ribs 2.

Holes 4 are made on the peripheral surfaces and over the entire height, and are a feature of the invention.

This tubular appliance is enveloped in a sheath 6 made of plastic film which is closed at its base 7 and open at the top part 8 with a projection 9 intended to protect the young plant.

In FIGS. 7 and 8, the modified cylinder 1a is of star-shaped cross-section and has holes 4a in its side wall.

The advantages of this appliance are many.

The plant 10 is developed in mould or compost 11 which is held by the bottom 7 of the sheath 6 which also prevents the water from leaking away completely and forms a reserve of humidity.

As the roots are progressively lengthened, certain roots 13, 14 are spread into the clearance 15 betwen the profile 16 of the helix and the sheath 6.

They are then in direct contact with the air which emanates from the condensation. They contribute a gaseous and humidity supplement to the nutritive roots 17 which obtain their nourishment in the compost 11, and an acceleration in the vegetation is observed.

These cylinders or tubes 1 are put in place in hole 18, of which the bottom is filled with compost 19 so that the upper orifice projects above the soil 20; this projection protects the young plant against insects. As the development progresses—FIG. 6—the plastic cylinder bursts and the sheath 6 disintegrates.

The shapes, dimensions and arrangements of those different components can vary within the limits of equivalence, as well as the materials which are used for the manufacture thereof without thereby changing the general conception of the invention as described.

I claim:

1. A plant propagation device comprising a flexible expandible tubular body open at both ends, said body having its longitudinal side wall formed with partially collapsed and recessed areas, said wall being perforated, and a tubular sheath of plastic film open at one end and closed at the other end and enclosing the tubular body with a clearance about said body.

2. A plant propagation device comprising a flexible tubular body open at both ends, said body having its radially expandible side wall formed with an elongated helical rib the turns of which are spaced along the body and which define between adjacent turns an elongated constricted area which is perforated, and a tubular sheath of plastic film open at one end and closed at the other end enclosing the tubular body with a clearance about said body.

3. A plant propagation device comprising a tubular body open at both ends, said body having its side wall formed of radially expandible folded and pleated star-shaped cross-section and being perforated, and a tubular sheath of plastic film open at one end and closed at the other end and enclosing the tubular body with a clearance about said body.

References Cited by the Examiner

UNITED STATES PATENTS

| | | | |
|---|---|---|---|
| Re. 21,820 | 6/1941 | Munsell | 47—1.2 |
| 1,936,988 | 11/1933 | Otwell | 47—37 |
| 3,080,680 | 3/1963 | Reynolds et al. | 47—37 |

ABRAHAM G. STONE, *Primary Examiner.*

J. R. OAKS, *Assistant Examiner.*